(No Model.)
W. L. GILCHRIST.
Holdback.
No. 235,226. Patented Dec. 7, 1880.
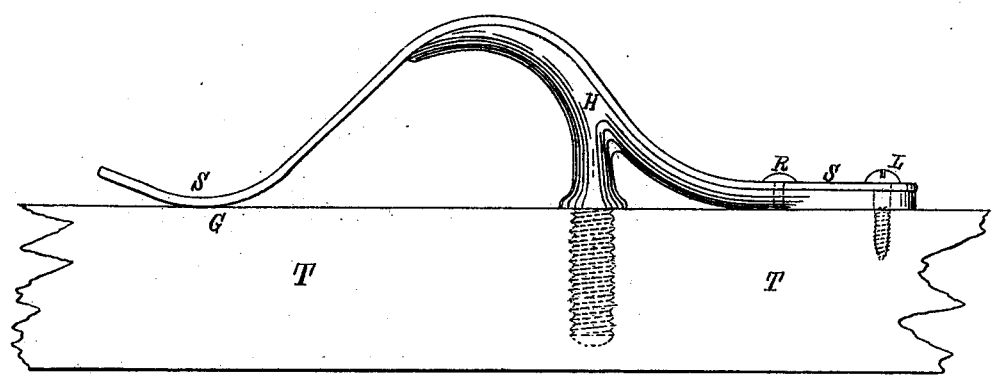
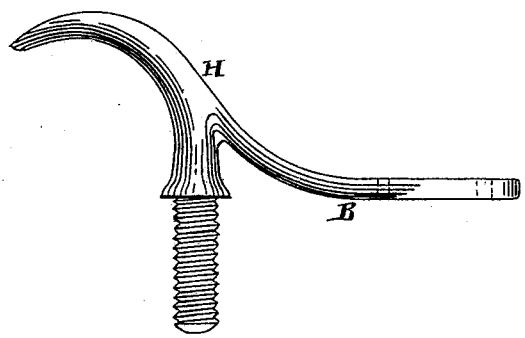
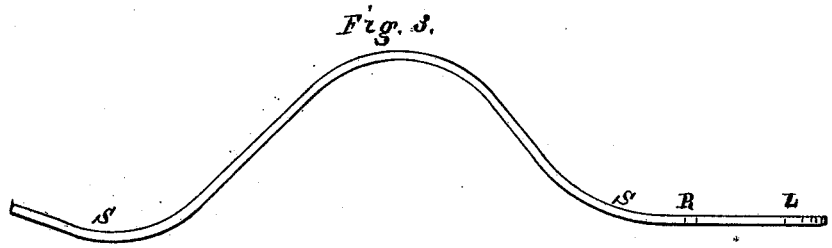
Witnesses:
D. S. Gilchrist
J. S. Shepard
Inventor.
William L. Gilchrist

UNITED STATES PATENT OFFICE.

WILLIAM L. GILCHRIST, OF FRANKLIN, NEW HAMPSHIRE, ASSIGNOR TO CLINTON BLAKE AND LYDIA D. GILCHRIST, OF SAME PLACE.

HOLDBACK.

SPECIFICATION forming part of Letters Patent No. 235,226, dated December 7, 1880.

Application filed July 10, 1880. (No model.)

*To all whom it may concern:*

Be it known that I, WILLIAM L. GILCHRIST, of Franklin, Merrimack county, New Hampshire, have invented an Improvement in Holdbacks, of which the following is a specification.

The object of my improvement as applied to vehicles is, first, to facilitate the attaching and detaching of the animal to and from the vehicle; secondly, to securely hold the side or holdback strap while performing its proper functions; thirdly, in case of accident or carelessness, should the tugs or drawing part of the harness become detached from the vehicle it will allow the side or holdback straps to automatically detach themselves from the thills, thus clearing the animal from the vehicle, avoiding damage thereto and danger to its occupants.

In the accompanying drawings, Figure 1 is a side view of holdback complete attached to section of thill. Fig. 2 is a side view of hook and brace, without the guard-spring. Fig. 3 is a side view of guard-spring.

By reference to Fig. 1, at the point G of the guard-spring S S, it will be seen, by the form of the spring S S at said point G, that the holdback or side strap may be passed into or out of the throat of the hook H at pleasure, the spring S S, at the point G, immediately resuming its pressure on the thill at said point G, thus completely inclosing the strap when in use.

As shown in Fig. 1, the object of the guard-spring S S, as attached to the hook H and thill T by the rivet R and screw L, is to prevent the possibility of the holdback or side strap becoming disconnected from the vehicle while in legitimate use.

The rear of the hook H, its brace B, and the spring S S are so formed that it is impossible for the holdback or side strap to become entangled in case of accident to the drawing portion of the harness or carelessness in harnessing or unharnessing, as is the case with the holdbacks now in common use, the strap passing forward under the spring S S at the point G.

The spring S S, by being attached firmly to the brace B of hook H, assists in strengthening said hook H, and the screw L, passing through the foot of the spring and brace to the hook H into the thill near B, prevents said hook from being displaced by any lateral strain.

The hook is composed of the malleable casting H, with threaded stud E screwed into the thill T and its extension-plate B, which said plate is flat on its top and has two holes drilled through it for the reception of the rivet R and screw L.

The guard-spring S S, as shown in Fig. 3, is formed of a single piece of flat steel, thin throughout its entire length, with holes drilled to correspond with the holes in brace before mentioned. This spring, when in position as shown in Fig. 1, passes over the hook H and is secured upon the flat extension-plate B by rivet R, also to brace and thill by screw L, said screw having the additional object before mentioned—that is, to resist any lateral strain.

The spring S S, from its fastenings R L, passes forward, over, and in contact with the hook H, to point G on thill T, where its free end bears against the thill T sufficiently to hold the strap securely in place. The end of the spring S S is turned up from the thill forward of point G sufficiently to admit of sliding the holdback-strap under it into the throat of hook H, avoiding the necessity of lifting said spring.

The spring being flat in its entire length, and being confined only at its heel by rivet R and screw L, is capable of deflection its entire length forward of said fastenings R L, and thus is more elastic and springs more freely than though it were pivoted or fastened at some intermediate point, as I am aware they have been before constructed—that is, with a bolt passing through a guard-spring, thence through a tube which serves for the holdback-strap to draw against, thence through the thill, while the spring was also secured to the thill behind the tube through which the bolt passes. The shape of this spring, however, between its fastenings being cylindrical in form and rigidly fastened, is not capable of any deflection, and merely serves as a brace to the tube and bolt. By this last-named construction any upward or downward strain on the strap, according as the attachment was located upon or under the thill, (there being no hook,) brings the pressure of the strap against the guard-spring, which is not desirable. By using a hook, as in my invention, such pressure is brought directly against the hook H, entirely relieving the spring S S of any duty except as a guard.

The entire form of my hook and spring, when attached to the thill, is such that it is impossible to entangle the holdback-strap or any portion of the harness either in the throat of the hook or forward or back of the hook and spring.

The especial advantages incident to my improvement are the additional safety secured to persons and property, the increased strength caused by securing the brace B of the hook H, by the screw L, to the thill T, the assistance of spring S S in strengthening the hook, simplicity of construction, durability, efficiency, and cheapness of manufacture.

Having thus fully described my invention, what I claim as new, and desire to secure by Letters Patent, is—

In a holdback for carriages, the combination of the hook H, having an extension-plate, and brace B, the curved guard-spring S, secured to said extension, passing over and resting upon the hook and terminating at a suitable distance in front of the latter, as and for the purpose set forth.

In testimony whereof I have signed my name to this specification in the presence of two subscribing witnesses.

WILLIAM L. GILCHRIST.

Witnesses:
 M. ROGERS,
 RUFUS I. MENNILL.